US011343854B2

(12) United States Patent
Sandholm et al.

(10) Patent No.: US 11,343,854 B2
(45) Date of Patent: May 24, 2022

(54) ALGORITHM TO PREDICT OPTIMAL WI-FI CONTENTION WINDOW BASED ON LOAD

(71) Applicant: CABLE TELEVISION LABORATORIES, INC., Louisville, CO (US)

(72) Inventors: Thomas Sandholm, Menlo Park, CA (US); Belal Hamzeh, Westminster, CO (US); Bernardo Huberman, Palo Alto, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 17 days.

(21) Appl. No.: 16/945,466

(22) Filed: Jul. 31, 2020

(65) Prior Publication Data

US 2021/0037569 A1 Feb. 4, 2021

Related U.S. Application Data

(60) Provisional application No. 62/905,704, filed on Sep. 25, 2019, provisional application No. 62/882,300, filed on Aug. 2, 2019.

(51) Int. Cl.
| | |
|---|---|
| *H04W 74/08* | (2009.01) |
| *H04W 28/02* | (2009.01) |
| *H04L 47/62* | (2022.01) |
| *H04W 24/08* | (2009.01) |
| *H04W 84/12* | (2009.01) |

(52) U.S. Cl.
CPC ..... *H04W 74/0816* (2013.01); *H04L 47/6225* (2013.01); *H04W 24/08* (2013.01); *H04W 28/0268* (2013.01); *H04W 28/0289* (2013.01); *H04W 84/12* (2013.01)

(58) Field of Classification Search
CPC . H04W 24/02; H04W 24/08; H04W 28/0268; H04W 28/0284; H04W 28/0289; H04W 74/002; H04W 74/0808; H04W 74/0816
See application file for complete search history.

(56) References Cited

U.S. PATENT DOCUMENTS

| | | | | |
|---|---|---|---|---|
| 2017/0005768 | A1* | 1/2017 | Yin | H04L 1/1867 |
| 2019/0045370 | A1* | 2/2019 | Al-Fanek | H04W 24/08 |
| 2020/0382425 | A1* | 12/2020 | Edalat | H04L 47/14 |
| 2021/0241096 | A1* | 8/2021 | Baskin | G06K 9/6228 |

* cited by examiner

*Primary Examiner* — Pao Sinkantarakorn
(74) *Attorney, Agent, or Firm* — David Daniel Smith

(57) ABSTRACT

A novel method that dynamically changes the contention window of access points based on system load to improve performance in a dense Wi-Fi deployment is disclosed. A key feature is that no MAC protocol changes, nor client side modifications are needed to deploy the solution. Setting an optimal contention window can lead to throughput and latency improvements up to 155%, and 50%, respectively. Furthermore, an online learning method that efficiently finds the optimal contention window with minimal training data, and yields an average improvement in throughput of 53-55% during congested periods for a real traffic-volume workload replay in a Wi-Fi test-bed is demonstrated.

20 Claims, 12 Drawing Sheets
(8 of 12 Drawing Sheet(s) Filed in Color)

ALGORITHM TO PREDICT OPTIMAL WI-FI CONTENTION WINDOW BASED ON LOAD

CROSS-REFERENCE TO RELATED APPLICATIONS

This application claims the benefit of and priority to U.S. Provisional Patent Application Nos. 62/882,300, filed Aug. 2, 2019, and 62/905,704, filed Sep. 25, 2019, each of which is hereby incorporated by reference in its entirety.

STATEMENT REGARDING FEDERALLY SPONSORED RESEARCH

None.

BACKGROUND

As more and more devices come on-line and demand an increasing amount of throughput and low latency, contention for the available wireless spectrum has become a growing problem.

Wi-Fi uses a Listen-Before-Talk (LBT) mechanism to access unlicensed spectrum in a fair and efficient way. The most used algorithm in today's networks is the Binary-Exponential-Backoff (BEB) mechanism that forces transmitters to double their wait time after each faded transmission. Many researchers have shown in the past that this mechanism scales poorly as the number of interfering transmitters increases and that adjusting the contention window can improve performance.

The problem has been recently exacerbated by the trend in the latest Wi-Fi specifications to bond existing 20 Mhz wide channels to 40, 80, and 160 Mhz bands, in order to allow wireless end-user devices to take advantage of throughput increases in high-speed broadband backhauls. Setting different QoS levels on different packets helps some high priority streams, but what if all streams are marked high priority? In other words, what if we want to improve the Wi-Fi experience without compromising fairness?

Many algorithms that improve BEB both in terms of throughput and fairness have been proposed, but failed to make an impact due to the inertia of (MAC) protocol adoption in in particular for end-user devices. Furthermore, a typical dense Wi-Fi deployment exhibits highly complex performance dynamics that are hard to reproduce in simulations alone. The complexity not only makes simulation results less reliable, but may also call for more flexible, and adaptable optimization models and methods.

SUMMARY

Shared medium access in Wi-Fi is implemented by the distributed coordination function (DCF) in the medium access control (MAC) layer. It is a contention-based protocol based on the more general carrier sense multiple access with collision-avoidance (CSMA/CA) protocol. When a frame is to be transmitted, a Listen-Before-Talk (LBT) mechanism is employed where the channel is first sensed and if busy the transmission attempt is delayed for a backoff period. The backoff period is determined by picking a uniformly random number of wait time slots, say r, in the interval [0 . . . CW], where CW is the contention window. The starting point CW is referred to as $CW_{min}$. The new transmission attempt is then made after r time slots. Each slot is a standardized time interval, typically about 9 µs. The most commonly used backoff algorithm, binary exponential backoff (BEB), doubles the contention window, CW, for every failed attempt, up to a maximum value of $CW_{max}$. After a given number of faded attempts the frame is dropped, and the error is propagated to higher-level protocols or the application. In case of a successful transmission the contention window is reset to $CW_{min}$.

The enhanced distributed channel access (EDCA) amendment (802.11e) introduced a QoS extension to DCF for contention-based access. A number of parameters can be configured in different service classes, or transmission queues to give different priorities to different flows. One set of these parameters is the ($CW_{min}$, $CW_{max}$) tuple. The standard specifies default values for this tuple, but access point administrators may change these values at will. For best effort (BE) traffic the default values are (15, 63). (802.11e has (15, 1023) as default, but the hostapd implementation we use sets (15,63) as default, which is why we use it here.) The present approach is based on changing these parameters dynamically and always setting ($CW_{min}$, $CW_{max}$) to ($CW_{opt}$, $CW_{opt}$) to effectively disable the exponential backoff, and leave it fully in the model's control how long the transmitters have to wait on average before attempting to retransmit ($9CW_{opt}/2$ µs).

Now the problem is reduced to finding and setting the optimal contention window, $CW_{opt}$, that maximizes some QoS parameter, such as throughput or latency. Here, only single-step prediction of $CW_{opt}$ is considered. That is, the model observes some state of the system in period $t_0$ and then sets the contention window to use in period $t_1$. The motivation behind this setup is that predictions further into the future will be less accurate. Furthermore, if there is a long gap between observation and enforcement, and between enforcements, the true $CW_{opt}$ may change within allocation periods, leading to suboptimal allocations.

Note, that this rules out machine learning techniques such as reinforcement learning (RL), where allocation decisions in the current period are assumed to impact rewards in multiple future periods. In other words, the greedy optimization strategy is always optimal in the present case.

In an embodiment, a novel machine-learning method controls the Wi-Fi contention window on access points (APs) deployed in a dense environment. The method does not require any changes on client devices, or to the Wi-Fi protocols, while still being fair across both participating and exogenous devices. The method is evaluated experimentally using a test-bed with off-the-shelf APs and Wi-Fi stations and using a trace of traffic volumes recorded from a real broadband deployment. The method takes both transmitters and system load into account to predict the optimal wait times at any given time, and uses a trained model capable of capturing correlations between easily observed measurements and optimal contention windows.

In an embodiment, a model predicts optimal contention windows and a learning algorithm continuously trains the predictive model to adjust the contention window based on system load.

In an aspect, a method for identifying an optimal contention window in a listen-before-talk network comprises: monitoring network traffic through a plurality of transmitters in a listen-before-talk (LBT) network; creating a calibration queue as part of a record; predicting an optimal contention window (CW) for an observed system bad using a machine learning model trained on the CWs from the record that provide the highest quality of service (QoS) at selected system loads; setting the predicted optimal CW on all of the transmitters in the LBT network; and adding the observed system load, the predicted optimal CW, and a resulting QoS to a prediction queue of the record. In an embodiment, a method for identifying an optimal contention window in a listen-before-talk network further comprises repeating the steps of predicting, setting and adding to dynamically adjust the optimal CW.

In an embodiment, creating the calibration queue comprises: recording system load and CW in a first time period and QoS in a subsequent time period; selecting a new CW round robin in exponential steps; setting the new CW on all of the transmitters in the LBT network; and repeating the steps of recording, selecting, and setting until the calibration queue is full. In an embodiment, creating a calibration queue further comprises randomly exploring a new CW and replacing a portion of the data in the calibration queue.

In an embodiment, system load is based on system throughput and number of active transmitters.

In an embodiment, quality of service comprises one or more parameters selected from the group consisting of throughput, latency, jitter, dropped packets and collisions.

In an embodiment, a method for identifying an optimal contention window in a listen-before-talk network further comprises quantizing system load based at least in part on sample distribution percentiles.

In an embodiment, a machine learning model is a linear regression model, a Naïve Bayes model, or a deep-neural network (DNN) model. In an embodiment, the regression model is $\log(CW_{opt})=\theta_0+\theta_1$ alevel$+\theta_2$ tlevel (Eq. 2).

In an embodiment, the calibration queue and/or the prediction queue is populated on a first-in first-out basis.

In an embodiment, the LBT network is a Wi-Fi network, a cognitive radio network, or a license assisted access (LAA) network.

In an aspect, a non-transitory computer-readable medium has a plurality of non-transitory instructions executable with a processor for identifying an optimal contention window in a listen-before-talk network, the plurality of non-transitory instructions being executable for: monitoring network traffic through a plurality of transmitters in a listen-before-talk (LBT) network; creating a calibration queue as part of a record; predicting an optimal contention window (CW) for an observed system load using a machine learning model trained on the CWs from the record that provide the highest quality of service (QoS) at selected system loads; setting the predicted optimal CW on all of the transmitters in the LBT network; and adding the observed system load, the predicted optimal CW, and a resulting QoS to a prediction queue of the record.

In an embodiment, the plurality of non-transitory instructions are further executable for repeating the steps of predicting, setting and adding to dynamically adjust the optimal C.

In an embodiment, the plurality of non-transitory instructions are further executable for quantizing system load based at least in part on sample distribution percentiles.

In an aspect, a system for identifying an optimal contention window in a listen-before-talk network, comprises: a cable modem termination system (CMTS) monitoring network traffic through a plurality of transmitters in a listen-before-talk (LBT) network; and a processor configured to monitor network traffic through a plurality of transmitters in a listen-before-talk (LBT) network; create a calibration queue as part of a record; predict an optimal contention window (CW) for an observed system load using a machine learning model trained on the CWs from the record that provide the highest quality of service (QoS) at selected system loads; set the predicted optimal CW on all of the transmitters in the LBT network; and add the observed system load, the predicted optimal CW, and a resulting QoS to a prediction queue of the record.

In an embodiment, the processor is further configured to record system load and CW in a first time period and QoS in a subsequent time period; select a new CW round robin in exponential steps; set the new CW on all of the transmitters in the LBT network; and repeat the steps of recording, selecting, and setting until the calibration queue if full.

In an embodiment, the processor is further configured to repeat the steps of predicting, setting and adding to dynamically adjust the optimal CW.

In an embodiment, the processor is further configured to quantize system load based at least in part on sample distribution percentiles.

In an embodiment, the processor is disposed within the cable modem termination system or externally to the cable modem termination system.

BRIEF DESCRIPTION OF THE DRAWINGS

This patent or application the contains at least one drawing executed in color. Copies of this patent or patent application publication with color drawing(s) will be provided by the Office upon request and payment of the necessary fee.

Illustrative embodiments of the present invention are described in detail below with reference to the attached drawings.

DETAILED DESCRIPTION

Figure 1:
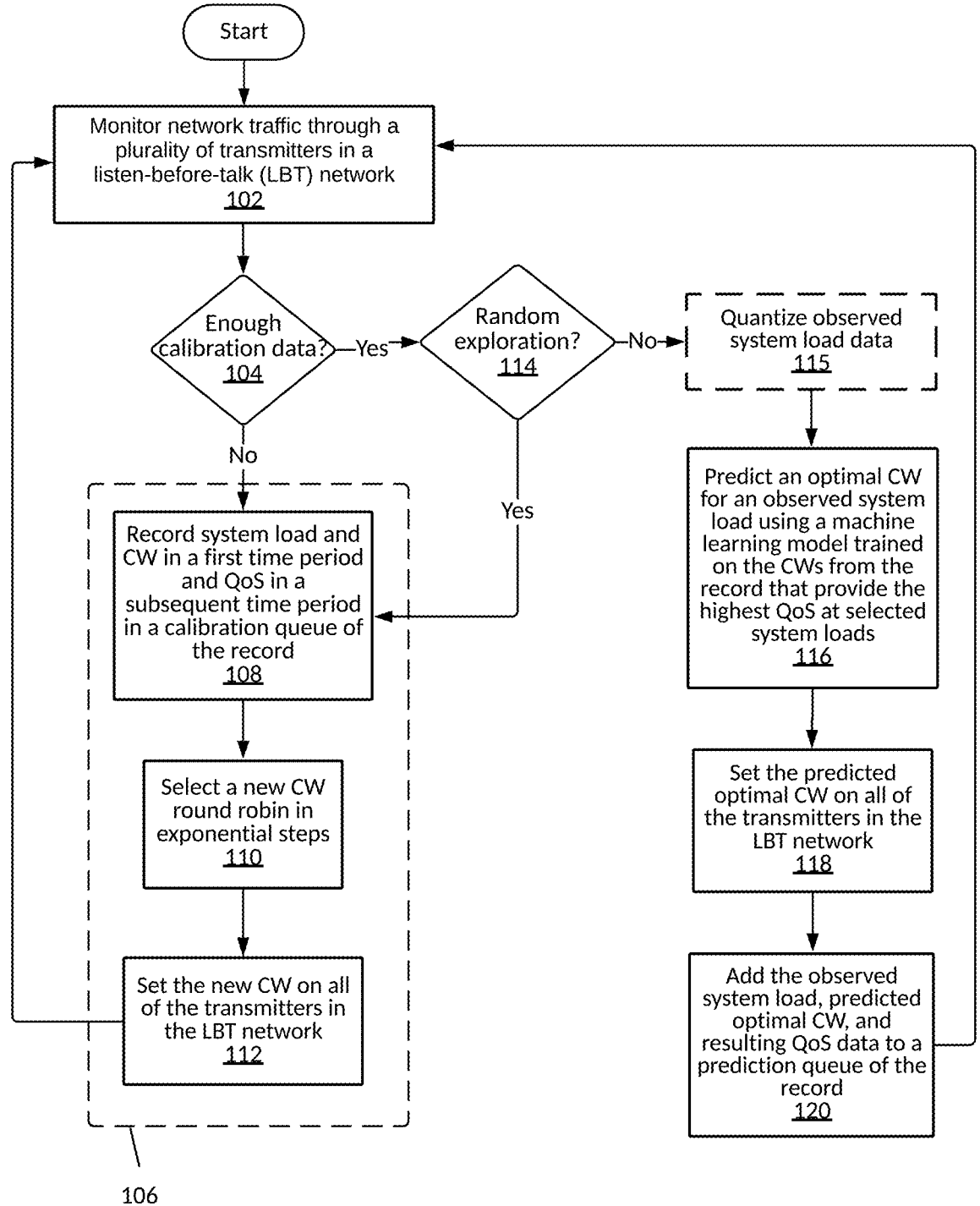
FIG. 1: Flowchart illustrating steps in a method for identifying an optimal contention window in a listen-before-talk network, according to an embodiment.

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, a station (STA) or client is any device that contains an IEEE 802.11-conformant media access control (MAC) and physical layer (PHY) interface to a wireless medium. For example, a station may be a laptop, a desktop computer, or a Wi-Fi phone.

As used herein, an access point (AP) is a networking hardware device that allows stations to connect to a wired network.

In an embodiment, a "transmitter" may be an access points (AP) in a wireless network or a combination of APs and stations (STAs), where the APs and STAs can be on the same network but need not be when they operate within the same radio frequency channel region and interference occurs. Machine learning models disclosed herein are able to account for external transmitters (i.e., transmitters outside of the monitored network), such as STAs on a different network than the network being monitored, because the external transmitter is indirectly accounted for by making a different CW more optimal given the same measured load.

As used herein, the term "channel" or "communication channel" refers to a physical transmission medium, such as a wire or optical cable, or a designated non-tangible broadcast medium, such as a wavelength used to convey an information signal from a sender(s) to a receiver(s). A channel has a certain capacity for transmitting Information, often measured by its bandwidth in Hz or its data rate in bits per second.

As used herein, "contention" is a media access method used to share a broadcast medium. For example, in a network, two or more nodes may wish to transmit a message across the same wire at the same time, which would result in a collision. To reduce collisions, current contention methods require a user to listen to the network to ensure the channel is free, then wait an amount of time (designated a "contention window") before starting to transmit.

The hub is any system (e.g., a cable modem termination system (CMTS)), device, software, or combination thereof, typically located in a cable company's hub site, or "headend", which is used to provide high speed data services (i.e., downstream and upstream transmissions), such as cable Internet and Voice over Internet Protocol. The channels are generally network bridges and modems that provide bi-directional data communication via radio frequency channels on a Hybrid Fiber-Coaxial (HFC) or Radio Frequency over Glass (RFoG). The channels are used to deliver broadband Internet access in the form of cable Internet, taking advantage of the high bandwidth of a HFC and RFoG network.

The hub is operable to configure the channels to communicate via a specific protocol (e.g., Data Over Cable Service Interface Specification, or "DOCSIS") specification. In this regard, the hub is operable to send control signals that direct the channels to operate in a particular manner with respect to the employed protocol. In an embodiment, the hub is operable to implement an optimal contention window.

Method

FIG. 1 is a flowchart illustrating exemplary steps in a method for identifying an optimal contention window in a listen-before-talk network. In step 102, network traffic through a plurality of transmitters in a listen-before-talk (LBT) network is monitored. Query 104 asks whether there is enough calibration data/if the calibration queue is full. If the answer to query 104 is no, a calibration queue is created (represented as dashed box 106). In step 108, system load and CW in a first time period and QoS in a subsequent time period are recorded, then a new CW round robin is selected in exponential steps (step 110). The new CW is set on all of the transmitters in the LBT network in step 112, and then the steps of monitoring (step 102), recording (step 108), selecting (step 110), and setting (step 112) are repeated until the calibration queue is full, and the answer to query 104 is yes. Query 114 asks whether random exploration is necessary. For example, random exploration may be triggered after a set number of cycles or a set amount of time. If the answer to query 114 is yes, the method returns to step 108 to obtain new data that replaces a portion of the existing data in the calibration queue. If the answer to query 114 is no, the method proceeds with quantizing observed system load data in optional step 115. An optimal CW for an observed system load is predicted using a machine learning model trained on the CWs from the record that provide the highest QoS at selected system loads, in step 116. The predicted optimal CW is set on all of the transmitters in the LBT network, in step 118. Then the observed system load, the predicted optimal CW, and a resulting QoS are added to a prediction queue of the record in step 120, and the method returns to step 102. The first time the method cycles through step 116, the predicted optimal CW is based solely on data in the calibration queue. Thereafter, the record contains both calibration queue and prediction queue data that are used to make the second and subsequent predictions.

Model

Syed and Rah disclose an adaptive backoff algorithm (ABA) derived from the probability of collisions, given a fixed number of active transmitters, and a configured minimum CW, $CW_{MIN}$. ("Adaptive backoff algorithm for contention window for dense ieee 802.11 wlans," *Mobile Information Systems*, 2016, 2016.) The optimal CW is then estimated as follows:

$$CW_{opt} = \frac{CW_{MIN}}{2} \times a - 1 \qquad (1)$$

where $CW_{MIN}$ is the default EDCA minimum contention window for the service class (15 for best effort), and a the number of active transmitters.

The present model is a generalization of the ABA model as follows:

$$\log(CW_{opt}) = \theta_0 + \theta_1 a + \theta_2 tp \qquad (2)$$

where the $\theta$ comprise the model coefficients to be trained, a the observed number of active APs, and tp the observed aggregate throughput from the last period.

Apart from the generalization and the additional load term, the model allows for continuous adaptation of the coefficients to fit the observed data. A learning method that trains this model online is discussed below.

The load term was introduced to account for environment interference impacting the throughput, i.e. factors beyond the APs that are controlled.

This general model (Equation 2) has been labeled the Machine-Learning Backoff Algorithm (MLBA) model by the present inventors. The log transform, which implies that the predictors are multiplicative as opposed to additive, is motivated by experiments. Intuitively, the expected throughput of a transmitter at any given time is inversely proportional to the current contention window, and is also proportional to the product of the probabilities that other transmitters will not transmit at that time.

Model Training

MLBA-LR

The simplest way to estimate the coefficients for an observed set of {a, tp} input parameters (predictors) and optimal CW (response) is by Least squares regression, e.g. ordinary least squares (OLS), where a coefficient is estimated by the covariance of the parameter with the response variable (output). So to estimate θ above one computes:

$$\hat{\theta}_0 = \log(CW_{opt}) - \hat{\theta}_1 a - \hat{\theta}_2 tp$$

$$\hat{\theta}_1 = \frac{\text{Cov}[a, \log(CW_{opt})]}{\text{Var}[a]}$$

$$\hat{\theta}_2 = \frac{\text{Cov}[tp, \log(CW_{opt})]}{\text{Var}[tp]}$$

The backoff algorithm deploying this form of parameter estimation is called MLBA-LR.

MLBA-NB

Another approach is to learn model parameters through a Naive-Bayes method, where the contention window that maximizes the conditional probability of a given state s={a, tp} is chosen. The probability can be computed according to Bayes theorem as:

$$CW_{opt} = \underset{CW}{\text{argmin}} \left\{ P(CW \mid s) \triangleq \frac{P(s \mid CW) \times P(CW)}{P(s)} \right\} \quad (3)$$

The backoff algorithm deploying this form of contention window estimation is called MLBA-NB.

MLBA-DNN

Another approach is to use a Deep Neural Network to estimate an optimal contention window CW given a state s. A Deep Neural Network (DNN) is defined as having multiple hidden layers. Between every two layers is a (nonlinear) activation function that determines how to map output from one layer into inputs of the next layer. The MLBA-LR model can hence be seen as a collapsed single-layer DNN. The minimal network configuration is, one input layer, two hidden layers, and one output layer. The output layer renders the final prediction and is thus often single-dimensional. The 3-layer (2 hidden layer) DNN model can then be expressed as:

$$CW_{opt}(x) = b^{(3)} + w^T h(b^{(2)} + W^{(2)} h(b^{(1)} + W^{(1)} x)) \quad (4)$$

where h( ) is the hidden layer activation function, in this case rectified linear units are used, ReLu(x)=max(x, 0), x is the input vector of {a, tp} tuples, $W^{(k)}$ is the matrix of weights for hidden layer k, $b^{(k)}$ is the bias vector for layer k (k=3 is the output layer), and w is the vector of weights between the last hidden layer and the single cell output layer.

To train this model (using backpropagation) mean square-error is applied as loss function, and the adam stochastic gradient descent algorithm. There is flexibility in selecting the number of nodes in the hidden layers; more nodes would mean a more accurate fit but longer training time. It also depends on the variance of the number of transmitters and load. A high variance and complex interrelationships may require more nodes to model appropriately. The backoff algorithm deploying this form of contention window estimation is called MLBA-DNN.

Note here that a typical DNN is a supervised learning model, but the training data is created on the fly and hence the method becomes unsupervised.

Evaluation of the Model

Traffic Volume Data

Given that the disclosed model is predictive and should be capable of learning some hidden behavior in traffic volume dynamics, a real-world trace from a residential deployment with cable modems connected to a cable headend (CMTS) over a HFC network was collected. The data comprise download volumes on a per-second basis for each cable modem. Volumes were captured on July 1st 2017 from 8 cable modems.

Due to the fact that the rates are set dynamically in a Wi-Fi network based on the measured signal-to-interference-plus-noise ratio (SINR), the test only captures whether the modem is active or not (the sum of active modems is quantity a), i.e. transmitting any data in each second of the trace, and then the test-bed finds the best rate.

One hour was selected for model building analysis, one hour for meta parameter evaluation and five hours for model prediction evaluation.

Testbed

The test-bed comprises 8 Wi-Fi Access Points transmitting on the U-NII-3 80 Mhz band. Two APs are TP-Link Archer AC1750 routers, and 6 are GL-AR750S-Ext devices. All run the latest OpenWrt release with a patch developed to control $CW_{min}$ and $CW_{max}$ from the hostapd control interface and CLI.

An additional 8 GL-AR750S-Ext are used as Wi-Fi clients, and 8 Raspberry Pi Model 3B run iperf3 servers that the clients connect to. The iperf servers could also run on the APs but it leads to CPU contention, limiting the throughput instead of airtime, at higher rates.

AU transmissions are done with 802.11ac VHT and a theoretical max throughput rate of 433 Mbps. With iperf3 servers running on the APs the max throughput is around 100 Mbps, whereas separating out the servers on the Pis improved the throughput to about 300 Mbps.

All traffic is going in the direction from the AP to the clients, with unrestricted TCP flows. The distance between the APs and the clients varies between 5 and 10 feet, and the distance between the APs varies between 2 and 6 feet. Finally, the distance between the clients varies between 2 to 5 feet. Both clients and APs are stationary throughout all experiments.

All APs and clients are connected to an Ethernet switch to avoid control and measurement traffic interfering with the Wi-Fi link. The Raspberry Pis are also connected to their dedicated AP with a direct Ethernet cable connection.

Opportunity Evaluation

The purpose of this section is to quantify what the improvements are assuming an optimal contention window is set.

Experiments are run in the test-bed, where the number of APs transmitting data is varied as well as the contention window used. The number of APs being controlled in the system is also varied. The ones not being controlled are assumed to follow the default back-off mechanism (BEB) as well as use the default (EDCA) transmission queue settings.

Both the throughput and the latency are measured across all the APs as well as across APs that are not being controlled.

The number of APs transmitting is varied between 2 and 8 and the [cwmin, cwmax] between [1, 1] and [1023, 1023], and the results are compared to the default best effort contention window setting of [15, 63] as well as a best effort contention window setting of [1, 1023].

The dotted lines in all graphs represent the corresponding value for the default contention window with exponential backoff (BEB), i.e. for best effort [cwmin, cwmax]=[15, 63] unless otherwise stated.

Throughput Improvement

Figure 2:
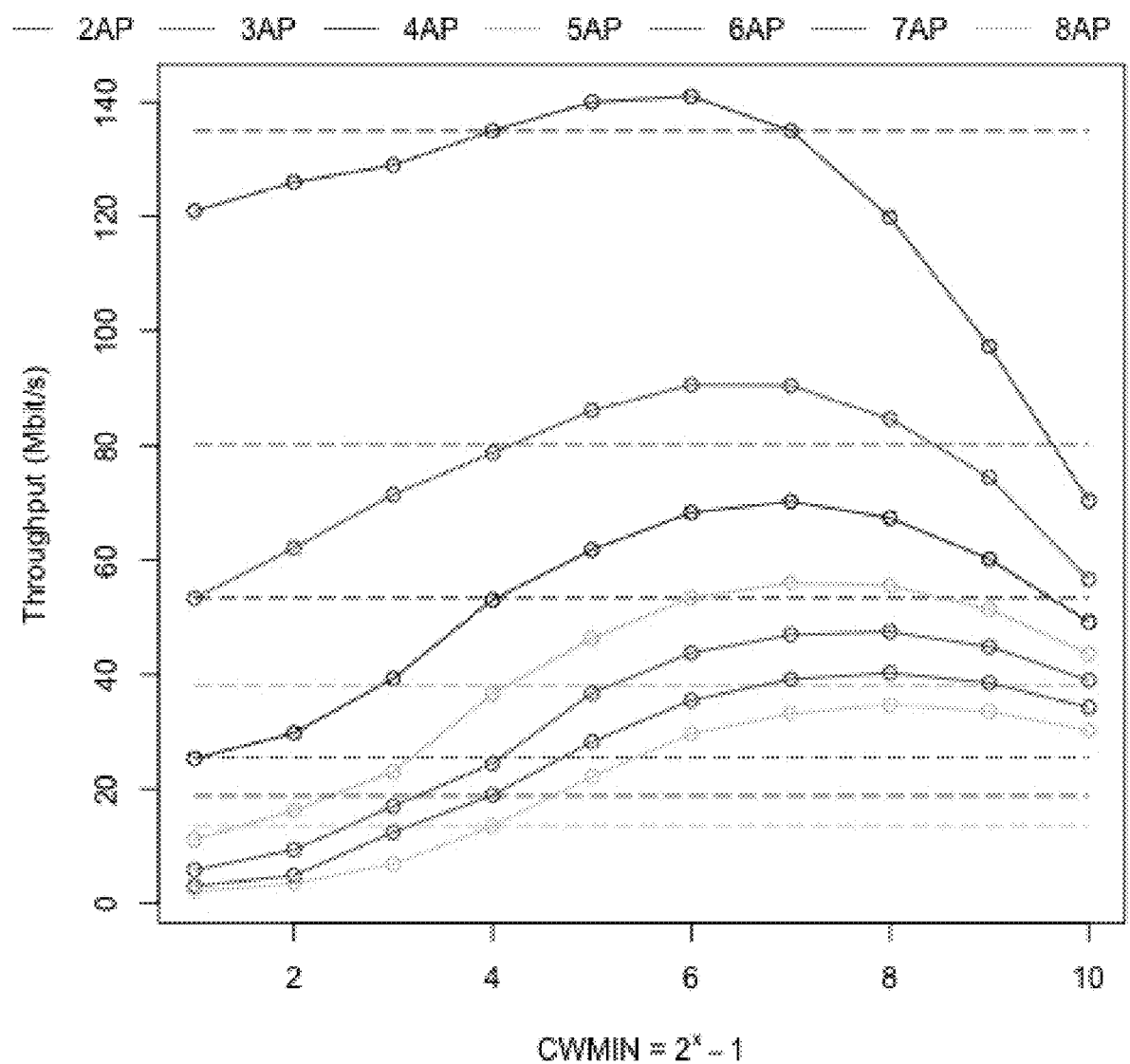
FIG. 2: Throughput with different Contention Windows (CW) and transmitting APs.

What is the improvement in throughput when setting an optimal contention window? FIG. 2 shows that the throughput improvement goes up to 155% with 8 concurrent transmitters when selecting the optimal CW compared to using the default backoff mechanism.

Latency Improvement

What is the improvement in latency when setting an optimal contention window? To answer this question, the same experiments as above were run but now the optimal latency in general as well as the latency under the optimal throughput settings as measured above were studied.

Figure 3:
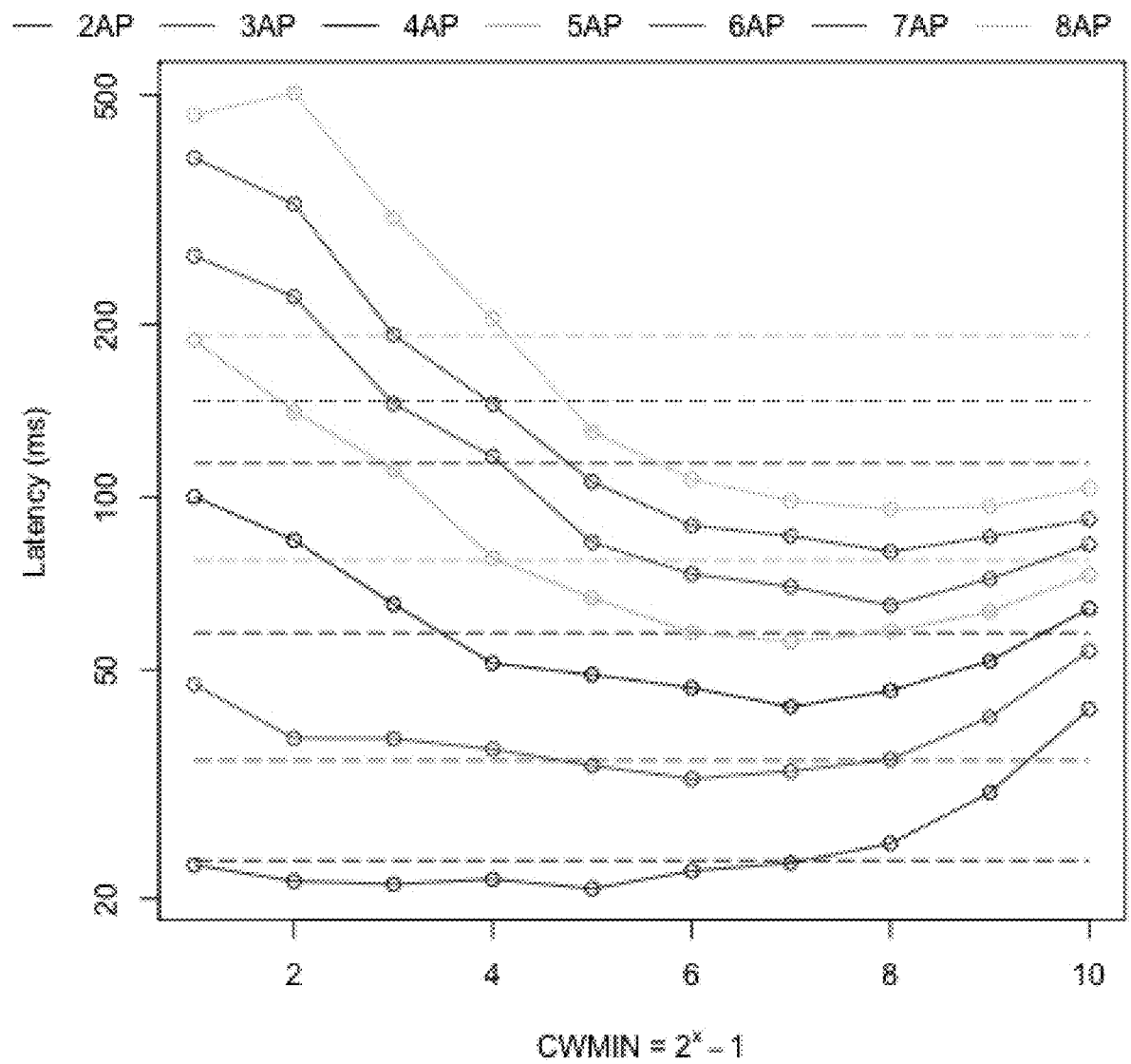
FIG. 3: Latency with different Contention Windows (CW) and transmitting APs.

FIG. 3 shows that the latency improvement goes up to 50% with 8 concurrent transmitters when selecting the optimal CW compared to using the default backoff mechanism. It is also possible to notice that the minimum latency point tends to coincide with the maximum throughput point (true for 3-8 APs, and close for 2 APs).

Workload-Based Experiments

Turning now to workload-based experiments where the data from the test-bed was replayed. First, the data were analyzed to determine which types of models are appropriate, then the general method is discussed in some more detail, model meta parameters are trained, and training speed simulated. Finally, an online test is run, benchmarking different models.

First the relationship between aggregate bad, active transmitters (APs) and optimal CW is investigated. For this purpose 1 hour (3600 data points) of the 8 workloads concurrently is replayed. For each data point replayed the throughput obtained with different contention windows (1 ... 1023) is measured. After the full replay is done the optimal cw setting is picked given observed throughput from the last period as well as observed number of active APs. This process is called offline or exhaustive calibration.

Figure 4:
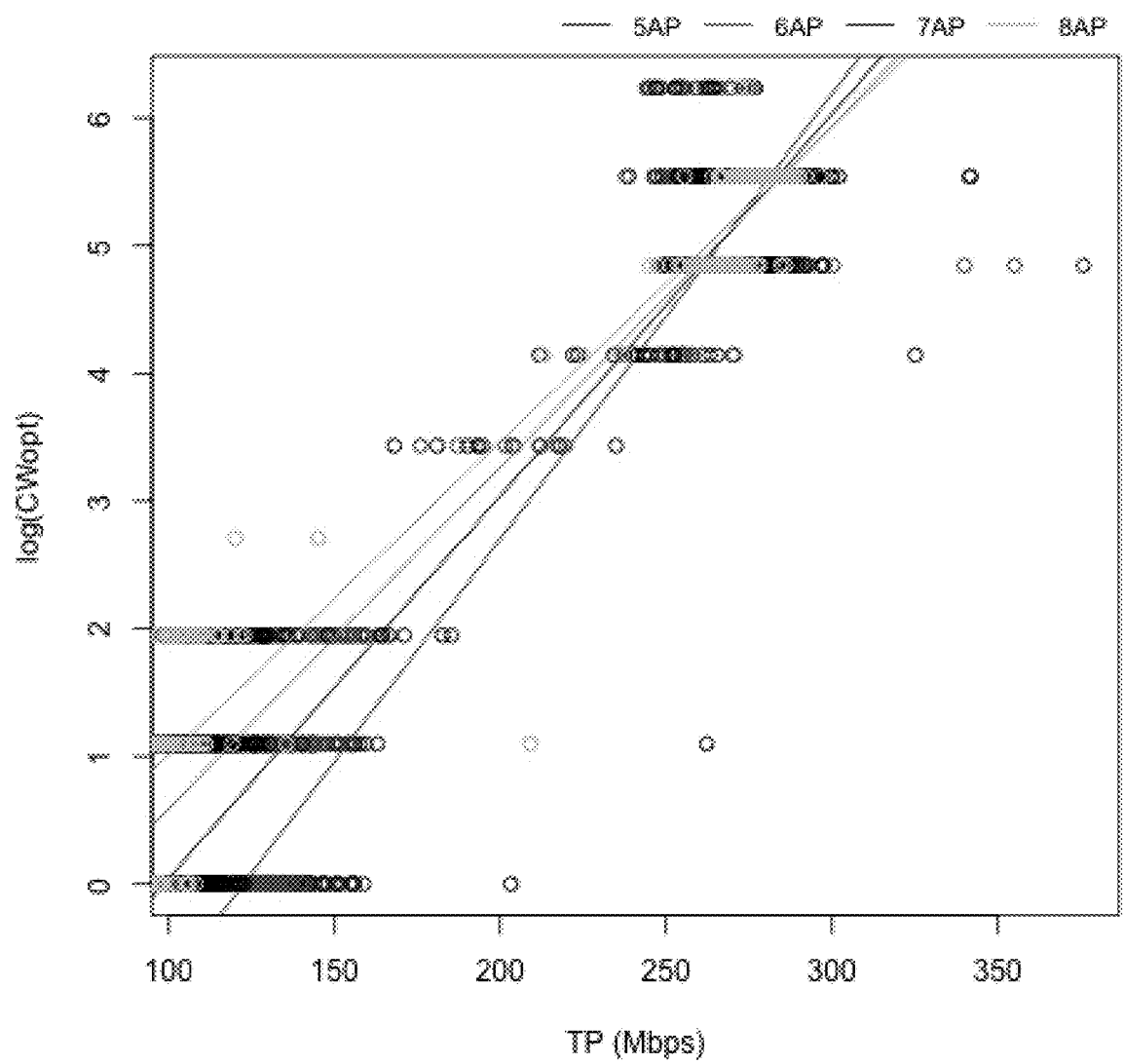
FIG. 4: Offline model fit.

Equation 2 is then fit to the measurements and an $R^2$ fit of 0.93 is obtained. The fitted model for this hour can be represented as:

$$\log(CW_{opt}) = -3.6 + 0.19a + 2.7 \times 10^{-8} tp \qquad (6)$$

where tp is in bits/s. All coefficients are statistically significant. The regression lines for different activity levels can be seen in FIG. 4. As a note, a model without log transform renders an $R^2$ of 0.73.

Of course the exhaustive calibration used above cannot be applied in a real system where you only get to see each load condition once and only get to pick one contention window to test. Even if an approximate exhaustive calibration could be performed, it would be best to minimize the training required to fit the parameters and also ensure that the parameters evolve over time to fit new behavior in the load conditions. For example a new source of interference introduced could simply be encoded as a new multiplier in the actives (number of active transmitters) parameter coefficient.

A description of how to train the models described herein, i.e. how to find and update the coefficients in Equation 2 online, is provided below. Training of the model proceeds in the following three steps:

1. Create a CW Observation List (CWObs Queue)
2. Update a Table recording optimal CWs (CWMax Table)
3. Fit Regression Model The CWObs Queue is comprised of two FIFO sub-queues of observed 4-tuples. One for calibration data and one for predicted values. The 4-tuples include: last observed aggregate throughput (tplast), last observed active transmitters (actives), cw enforced (cwenf), and throughput obtained with enforced cw (tp). An example fictive CWObs List can be seen in Table 2. The two FIFO sub-queues are needed since calibration involves cycling through all possible CW values, and if these calibration points disappear the algorithm may be locked into a suboptimal region, if it were solely based on predictions.

TABLE 2

Example CWObs Queue

| tplast | actives | cwenf | tp |
|---|---|---|---|
| 123489331 | 20 | 15 | 223489331 |
| 223489331 | 22 | 31 | 323489331 |

The CWMax Table is updated whenever there is new data in the CWObs Queue. The table quantizes actives into alevel and tplast into tlevel levels and records the optimal cw cwopt used for the maximum tp as mtp at that level. An example fictive CWMax table can be seen in Table 3.

TABLE 3

Example CWMax Table

| alevel | tlevel | mtp | cwopt |
|---|---|---|---|
| 1 | 1 | 123489331 | 15 |
| 1 | 2 | 223489331 | 31 |

Finally, a ML regression model is fit as per Equations 2, 3 and 4 with {alevel, tlevel} tuples from the table as features and cwopi as targets. Note mtp is only kept in the table to be able to update cwopt.

Now, the model execution (prediction) part of the algorithm can proceed as follows:

1. Map the observed actives and throughput to the corresponding {alevel, tlevel}-level tuple
2. Use the trained model to predict the cwopt with this level as input, and set it on all APs
3. Track the cw used and record the throughput obtained in the next time period, and add it to the CWObs Queue Note that thanks to the CWObs queue the quantization of levels can be done dynamically based on the current content in the queue, to avoid sparsity in the CWMax Table. To ensure that the queue has a wide set of cwenf values some initial or random exploration at infrequent intervals is performed to avoid lock-in into a cw range.

The approach assumes that there is a good correlation between the number of active transmitters, and the aggregate load from one period to the next. In other words the approach assumes the process has the Markov property. This has been verified for the traces used in periods from 1 to 10 s. If this were not true the observed actives and load levels would not be fed into the models, but the predicted values.

Some ML models were used for this task too but it is overkill with the tested data sets due to the high autocorrelations. For more complex models with hidden parameters like CONN it could also capture the predictive aspect of these values, but that remains to be verified.

Calibration Period Estimation

To determine how much training data is needed for the predictions to reach the optimal performance, and to get a sense for how frequently the models need to be recalibrated, training simulations were run using the data generated by the offline calibration. Recall, that the offline training data contains a record for each step in the workload trace for each possible contention window, recording the throughput obtained.

Simulating a real run thus involves picking a single record corresponding to a single contention window for each step. BEB, ABA and MLBA were compared to an optimal picker that always picks the contention window with the optimal throughput value. For MLBA, Linear Regression (LR), Deep Neural Network (DNN) and Naive Bayes (NB) were used for parameter estimation.

During a training phase random contention windows are picked before the model is trained with the recorded data and predictions made. Now the steps used, recall each step is a second, are varied before predictions are started. The predictions are then used throughout the data set which is one hour, or 3600 data points.

Figure 5:
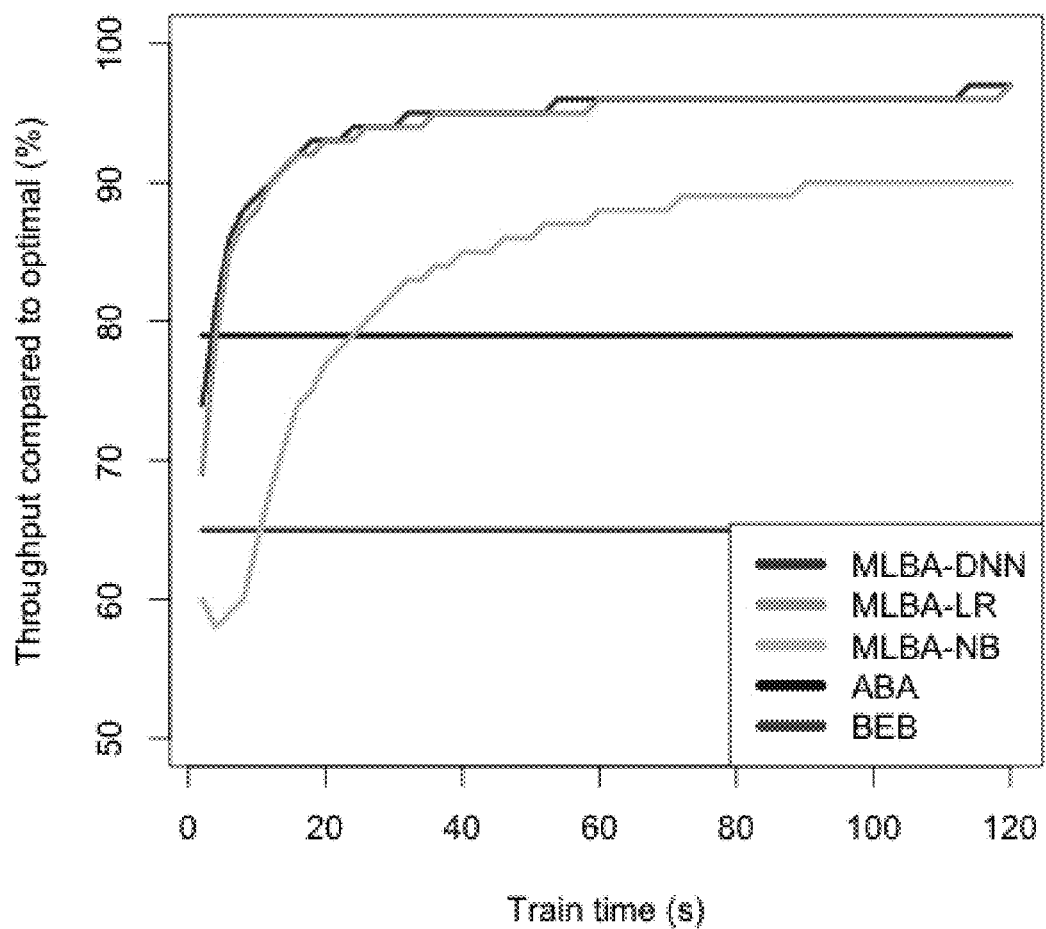
FIG. 5: Prediction performance with different train times.

The throughput obtained compared to the optimal throughput for BEB, ABA and MLBA are shown in FIG. 5.

The performance of ABA is reached with MLB almost instantaneously with just a few data points in the trained model. The prediction performance then converges to its best result at about 95% of optimal after about 35 seconds, MLBA-DNN performs marginally better than MLBA-LR and tends to reach plateaus earner. MLBA-NB converges very slowly compared to the other MLBA algorithms. The DNN model is configured with 10 nodes in both hidden layers.

Based on this result, the calibration period (using round robin CWs) is set to 30 seconds.

Training History Estimation

Now, how much data should be kept in the CWobs and Cwmax tables before old values are evicted? And how often should recalibration and exploration of new CW values that are not predicted to be optimal occur? To answer those questions a 15 minute period (900 data points) is picked and all the training algorithms are run with different parameter values for table size and recalibration probability. Table 4 shows the results. History denotes the size of the CWobs table and ca/lb. denotes the probability of exploring and calibrating new CW values. The table also shows the median throughput improvement over BEB for the different algorithms.

TABLE 4

Training History and recalibration frequency summary

| history | calib. (%) | LR (%) | NB (%) | DNN (%) |
|---|---|---|---|---|
| 150 | 1 | 50.8 | 54.3 | 52.9 |
| 600 | 1 | 52.5 | 54.1 | 55.3 |
| 300 | 1 | 54.1 | 49.5 | 56.6 |
| 300 | 5 | 52.7 | 56.0 | 51.4 |
| 300 | 10 | 50.3 | 43.9 | 51.1 |

The configuration with the overall best improvements across all training algorithms was a history of 600 seconds and recalibration frequency 1%. Hence, that configuration is selected for the subsequent benchmarks. Note that DNN outperformed LR in 4 of 5 tests, and NB in 3 of 5 tests. DNN also achieved the overall highest improvement, 56.6%.

Longitudinal Benchmarks

Figure 6:
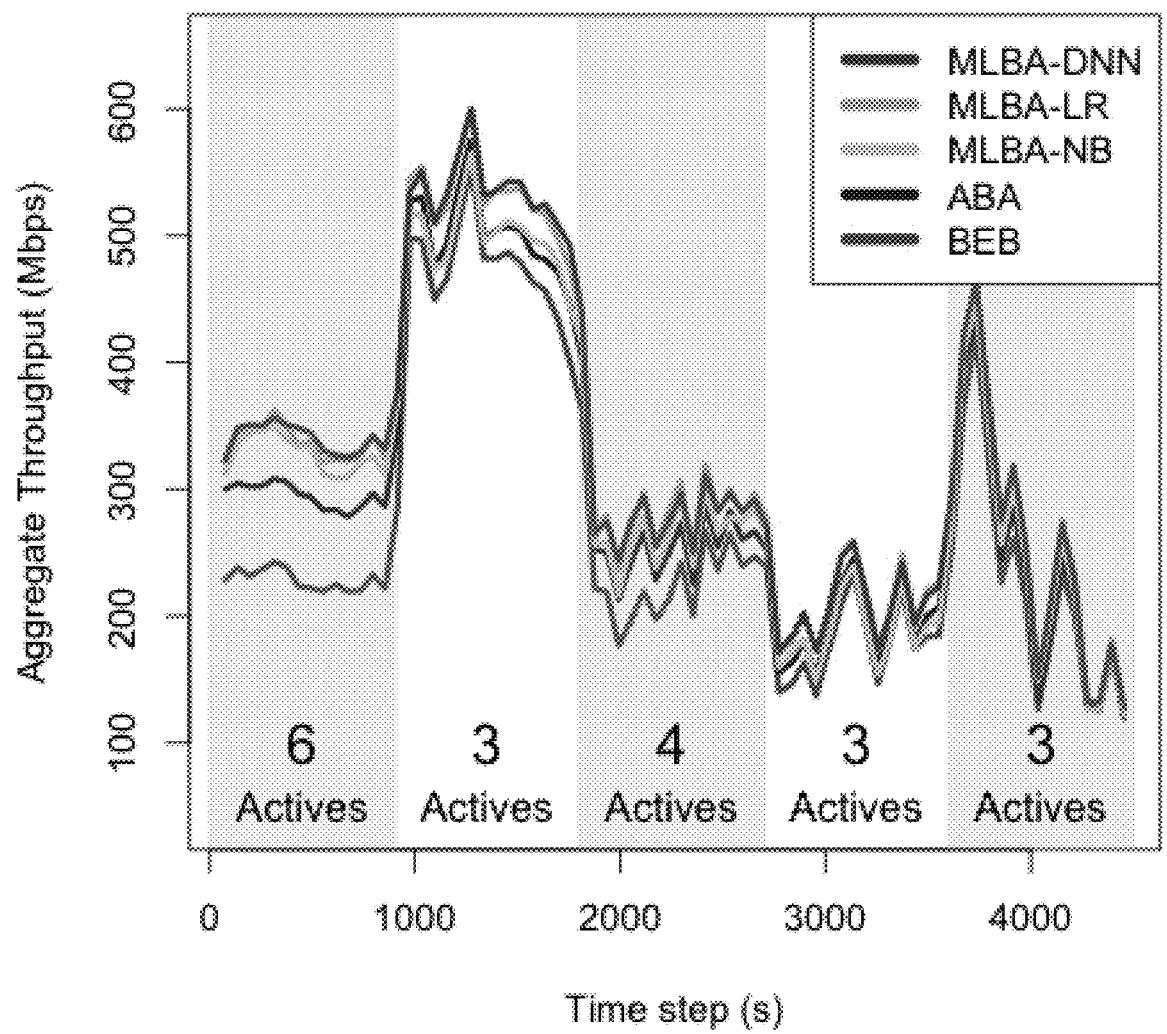
FIG. 6: Prediction test results (1-minute averages) for 5 test periods and with average actives for each period displayed.

Finally, using the best performing configuration described above, the backoff method was tested across five 15 minute periods succeeding the model building period and the throughput between BEB, ABA, and the MLBA algorithms was compared. To cover a larger time span, only the first 15 minutes of each of the 5 hours in the test set was used. The results can be seen in FIG. 6.

Actives were grouped into two levels (0 . . . 3 and 4 . . . 8, alevel=1 and alevel=2) and 5 load levels were used (tlevel=[0, 5)) based on measured percentiles to reduce the sparsity of the throughput list data.

To test significance of differences between methods the empirical percentile of percent difference was taken between the methods, period-by-period. The average difference and the percentile where the method tested starts getting a positive difference is then measured. For example, if method A on average across all replayed time steps (seconds) achieves an aggregate throughput across all APs that is 35% higher than method B and method A has a higher throughput than B in 70% of all time steps: Avg(A>B)=35 and SigL(A>B)=30. SigL here can be compared to a one-tailed statistical significance level, in that a 5% significance level is equivalent to SigL(A>B)=5. Table 5 summarizes the statistical test results. The MLBA algorithms do better in periods of heavier load (e.g. period 1 in Table 5) compared to both ABA and BEB, and those are also the periods where MLBA-DNN tends to do slightly better than MLBA-LR.

TABLE 5

Average Improvements and Significance Levels. The five time-period results (see FIG. 6) are parenthesized.

| Hypothesis | Avg (%) | SigL (%) |
|---|---|---|
| ABA > BEB | 13 (31, 8, 14, 7, 5) | 15 (5, 20, 10, 20, 30) |
| LR > BEB | 25 (49, 16, 27, 17, 14) | 10 (5, 10, 10, 15, 20) |
| DNN > BEB | 26 (53, 18, 26, 16, 14) | 10 (5, 10, 10, 15, 20) |
| NB > BEB | 18 (48, 10, 19, 5, 8) | 20 (5, 20, 15, 40, 30) |
| LR > ABA | 10 (15, 8, 12, 9, 9) | 15 (5, 20, 15, 20, 20) |
| DNN > ABA | 11 (17, 10, 11, 9, 9) | 15 (5, 20, 15, 20, 25) |
| NB > ABA | 4 (13, 2, 5, −2, 3) | 40 (10, 50, 40, 65, 45) |
| DNN > LR | 1 (3, 2, 0, −1, 0) | 50 (35, 40, 55, 60, 55) |
| DNN > NB | 7 (4, 9, 7, 11, 6) | 25 (30, 20, 25, 20, 20) |

Implementation

The embodiments herein may be implemented in a variety of ways as a matter of design choice. For example, the invention can take the form of an entirely hardware embodiment, an entirely software embodiment or an embodiment containing both hardware and software elements.

Figure 7:
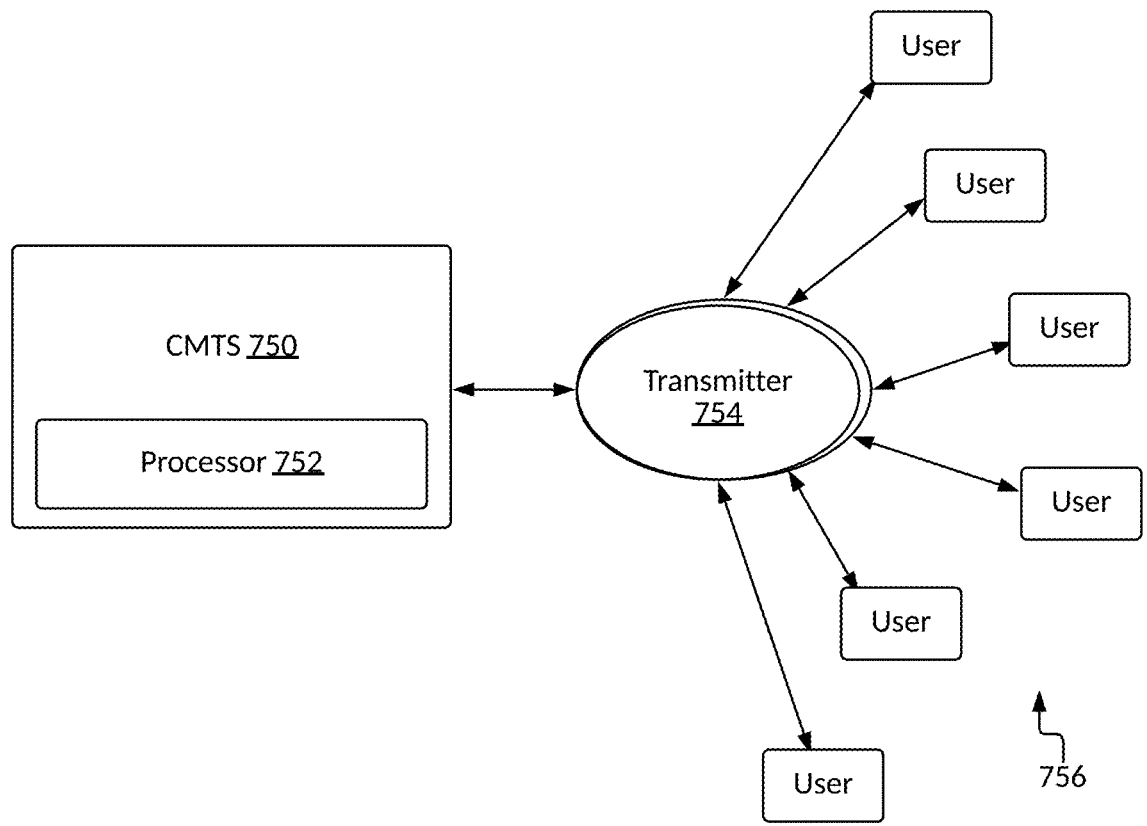
FIG. 7: Block diagram of an exemplary system for performing methods described herein.

FIG. 7 is a block diagram of an exemplary system for performing methods described herein. For example, the system may include a cable modem termination system (CMTS) 750 configured to transmit/receive data to/from a plurality of transmitters 754 operably communicating with one or more user devices 756. For example, transmitters 754 may be access points in a Wi-Fi network. The CMTS may, for example, communicate with transmitters 754 via a cable access network that includes a combination of optical fiber and/or coaxial cables, amplifiers, and electrical/optical converters. A processor 752 is depicted as being disposed within the CMTS, but it should be recognized that processor 752 may be implemented as a separate device from CMTS 750.

Figure 8:
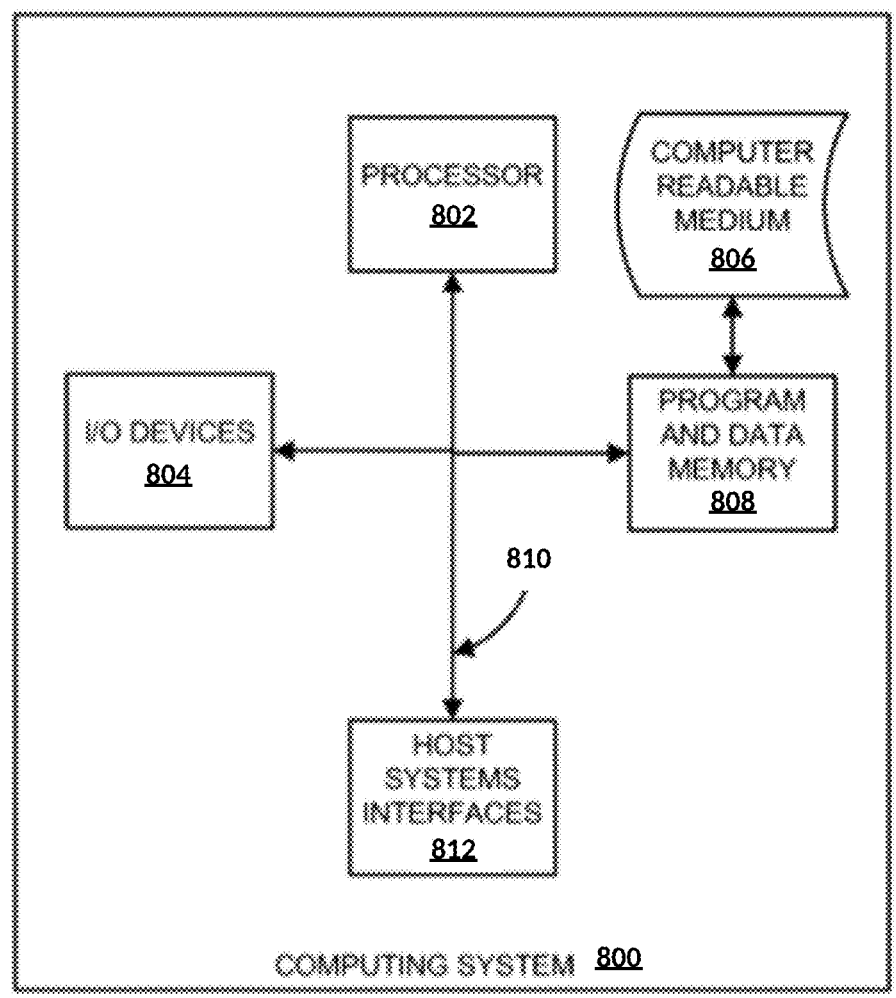
FIG. 8: Block diagram of an exemplary computing system in which a computer readable medium provides instructions for performing methods described herein.

In an embodiment, the invention is implemented in software, which includes but is not limited to firmware, resident software, microcode, etc. FIG. 8 illustrates a computing system 800 in which a computer readable medium 1306 may provide instructions for performing any of the methods disclosed herein. Furthermore, the invention can take the form of a computer program product accessible from the computer readable medium 806 providing program code for use by or in connection with a computer or any instruction execution system. For the purposes of this description, the computer readable medium 806 can be any apparatus that can tangibly store the program for use by or in connection with the instruction execution system, apparatus, or device, including the computer system 800. The medium 806 can be any tangible electronic, magnetic, optical, electromagnetic, infrared, or semiconductor system (or apparatus or device). Examples of a computer readable medium 806 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 800, suitable for storing and/or executing program code, can include one or more processors 802 coupled directly or indirectly to memory 808 through a system bus 810. (Processor 802 and processor 752 of FIG. 7 may be the same device.) Memory 808 can include local memory employed during actual execution of the program code, bulk storage, and cache memories which provide temporary storage of at least some program code in order to reduce the number of times code is retrieved from bulk storage during execution. Input/output (I/O) devices 804 (including but not limited to keyboards, displays, pointing devices, etc.) can be coupled to the system either directly or through intervening I/O controllers. Network adapters may also be coupled to the system to enable the computing system 800 to become coupled to other data processing systems, such as through host systems interfaces 812, or remote printers or storage devices through intervening private or public networks. Modems, cable modem and Ethernet cards are just a few of the currently available types of network adapters.

A patch for hostapd in the latest Open-Wrt release (18.06.1) was implemented that exposes the $CW_{min}$ and $CW_{max}$ settings for the transmission queues. It allows one to control all queues, although the experiments only change the best effort (BE) queue setting. The patch uses the hostapd control interface and also adds new hostapd_cli commands.

Depending on the deployment scenario, two ways to control the APs are offered. The LAN controller is appropriate if the controller can be deployed in the local network, and the Cloud Controller is appropriate if the APs only had outbound access and should be controlled from an external network, e.g. a Cloud platform.

LAN Controller

In the LAN controller setup a HTTP REST API exposed from the APs directly is provided. Hostapd_cli is used behind a lighttpdWeb server via CGI. The CGI scripts are then invoked by an HTTP client remotely from the controller. The roundtrip time to either call the custom CW control APIs or the preexisting all_sta call to collect transmission data is about 20 ms, without any optimizations. To improve the performance further a custom TCP sever embedding the hostapd_cli protocol could be used on the AP. The advantage of the current solution is, however, that it requires minimal modifications on the AP and leverages existing standard applications already in use in most APs today. After collecting data with this interface, the controller feeds it into the contention window predictor, which then uses the load data to estimate active transmitters, and load, and finally predict the optimal CW. The optimal CW is then set across all APs using the same interface.

Figure 9:
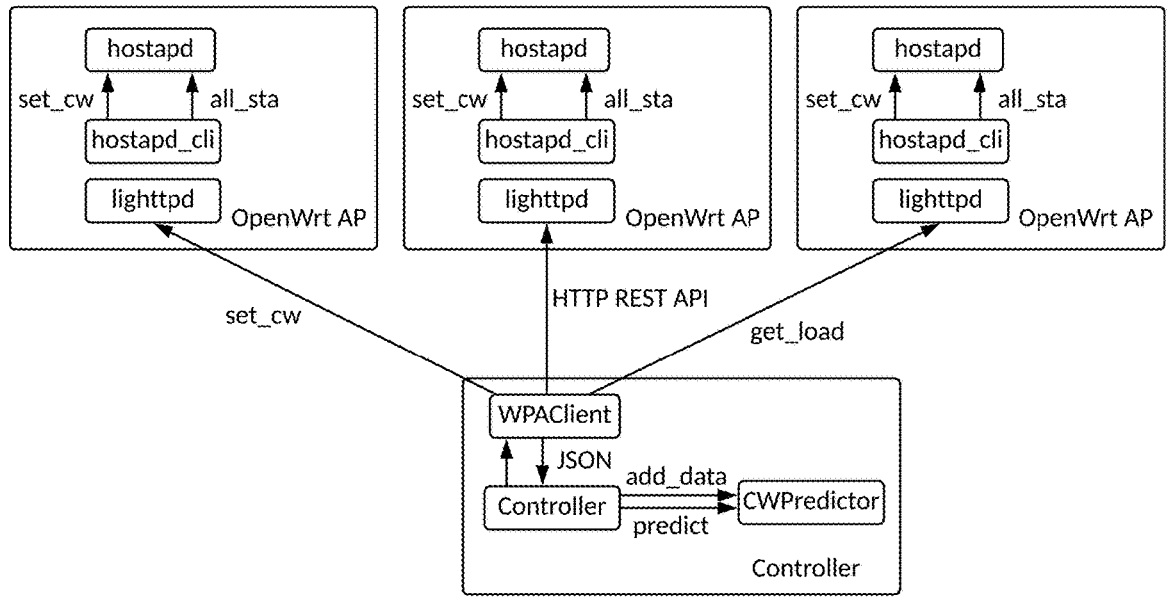
FIG. 9: LAN Controller Contention Window Control Software Architecture.

Collecting data, and making predictions is all done online and continuously in windows of 1 to 10 s. The controller and predictor are both written in Python using numpy, sklearn, kerns, tensorflow, and scipy, and also comprises a http client that converts the hostapd control interface output into JSON. The controller also exposes a Flask-based REST interface for monitoring the status of the system and predictions. The LAN controller architecture is depicted in FIG. 9. All the experiments presented here use the LAN controller API.

Cloud Controller

Figure 10:
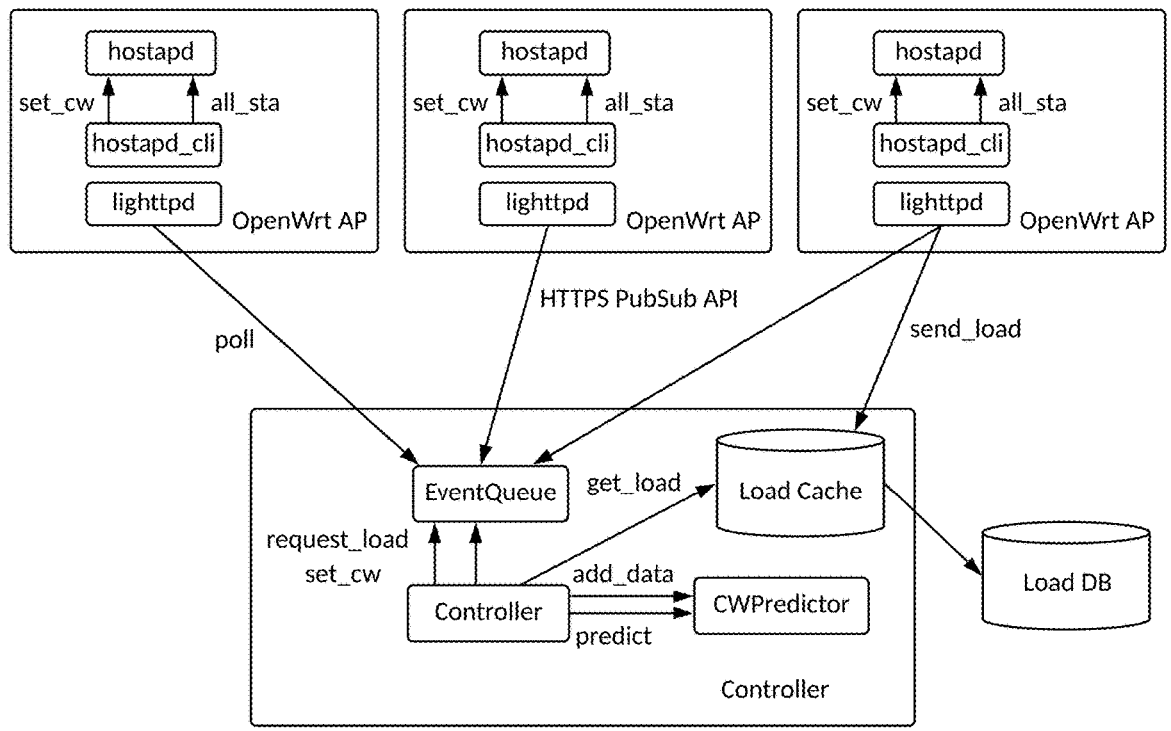
FIG. 10: Cloud Controller Contention Window Control Software Architecture.

If the controller that is responsible for changing the contention window and collecting load from the APs is deployed in a network that does not have inbound access to the network where the APs are deployed, which is typical for Cloud deployments, a pubsub API is provided that effectively turns pushes into pulls and allows similar control as if the AP API could be accessed directly. Instead of using the lighttpd server API this model makes use of a lua socket client that long-polls a python Flask server on the remote network. This server in turn has an API that allows direct access to set the contention window and request load. When load is requested the APs push the current values to a Load cache in the cloud, implemented using Redis. The controller can then obtain the payload for all APs directly from Redis. Before flushing the load (only most recent values are kept in memory), the load data is written to a database for off-line analysis. The database is implemented in InfluxDB. The collection and prediction interval can, like the LAN controller, be set to between 1 to 10 s, note however that this architecture increases the latency both to set the contention window and to collect load, but what is lost in latency is gained in scalability as all the APs are independently polling the PubSub channel and executing load and cw change commands. Hence this solution is also recommended for larger deployments. Finally, we also note that the AP to Controller communication goes across networks and potentially over the Internet, in the cloud deployment case, so the protocol runs over HTTPS using the OpenWrt luasec package. The Cloud controller architecture is depicted in FIG. 10.

The predictive model is trained with machine learning for a saturated system. A non-saturated system does not have the same contention issues, in that the default BEB algorithm works better under those conditions. Hence, a separate learner could be applied to predict whether the system will be saturated in the next time period, and the appropriate backoff algorithm selected.

Supplemental Material

Partially Managed System

Can throughput and latency be improved even for streams that are not controlled? The same experiment as above was run but only 4 of the 8 APs were controlled. The APs not controlled use the default backoff settings and mechanism.

Figure 11:
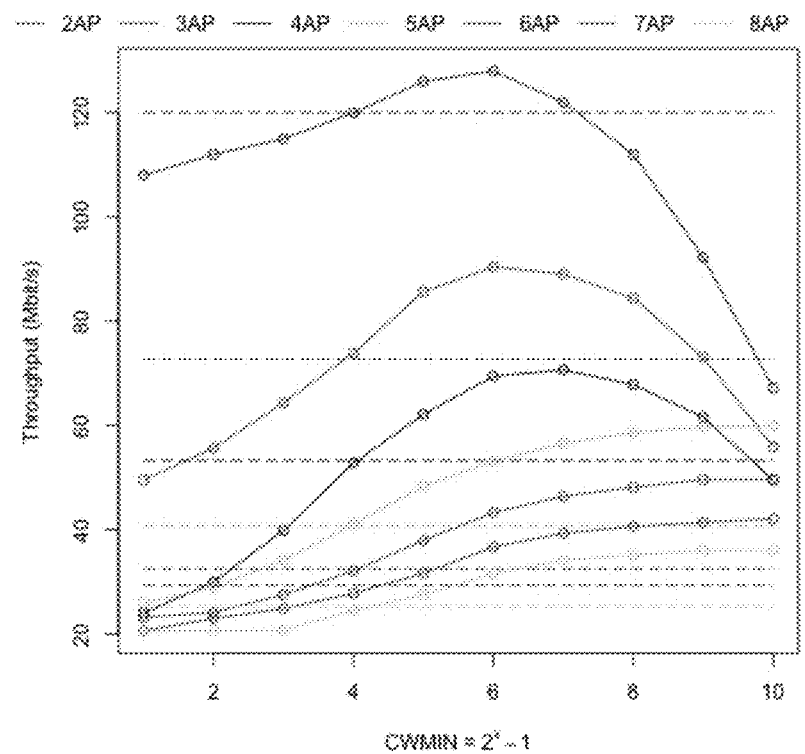
FIG. 11: Overall Throughput and Latency with half of the APs controlled. X axis denotes CWs on APs being controlled.
Figure 11:
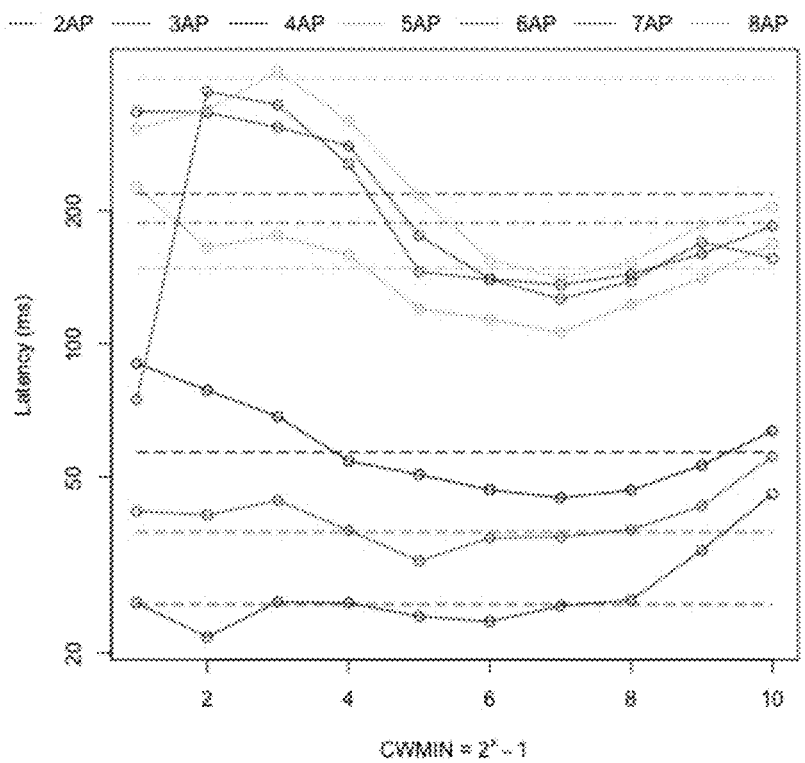

FIG. 11 shows that the aggregate throughput and latency still improve when only half of the APs are controlled.

Figure 12:
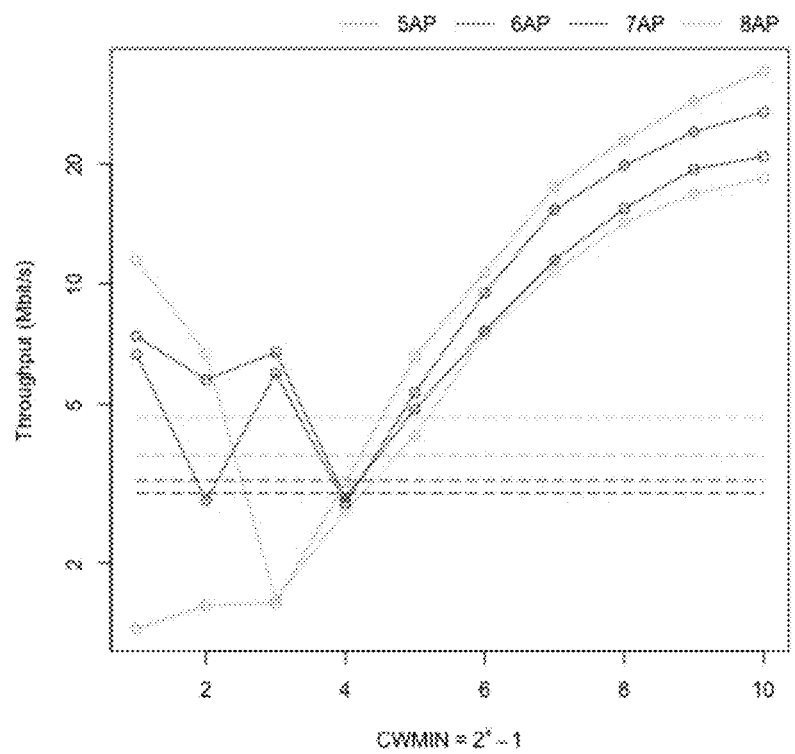
FIG. 12: Throughput and Latency of APs not controlled. X axis denotes CWs on APs being controlled.
Figure 12:
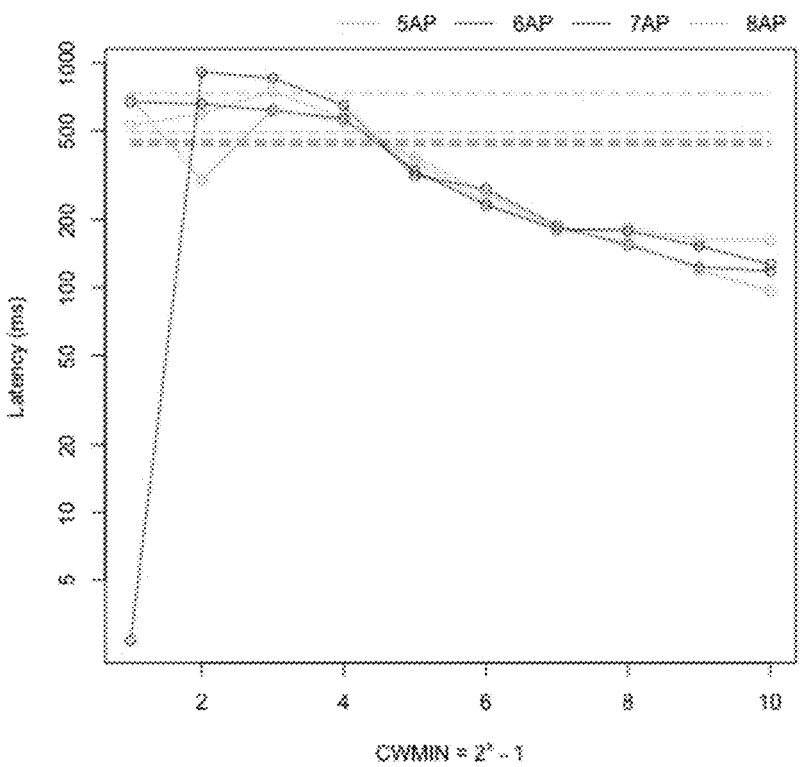

FIG. 12 shows that both the throughput and the latency improve for the APs not controlled. The way to read it is to first look at the optimal CW value in FIG. 11 for 5, 6, 7 or 8 APs, and then compare the dotted line to the solid line value for that CW in this figure.

Window Range

If the contention window is adjusted with the default backoff mechanism (BEB), but the minimum and maximum window change to be the same as the minimum and maximum windows used by the dynamic method, does it improve or worsen the throughput and latency? Note, that with the dynamic method the $CW_{min}$ and $CW_{max}$ are set to the same value, so what is being set equal for BEB and the dynamic method here is the range of all allowable values of CW.

Figure 13:
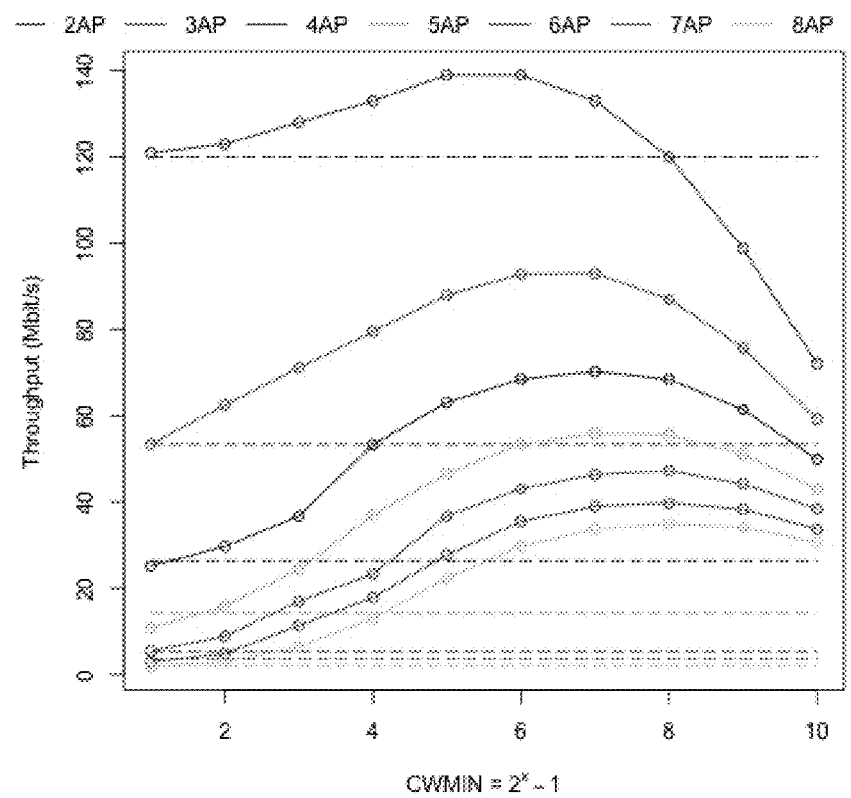
FIG. 13: Throughput and Latency with default cwmin/max [1,1023].
Figure 13:
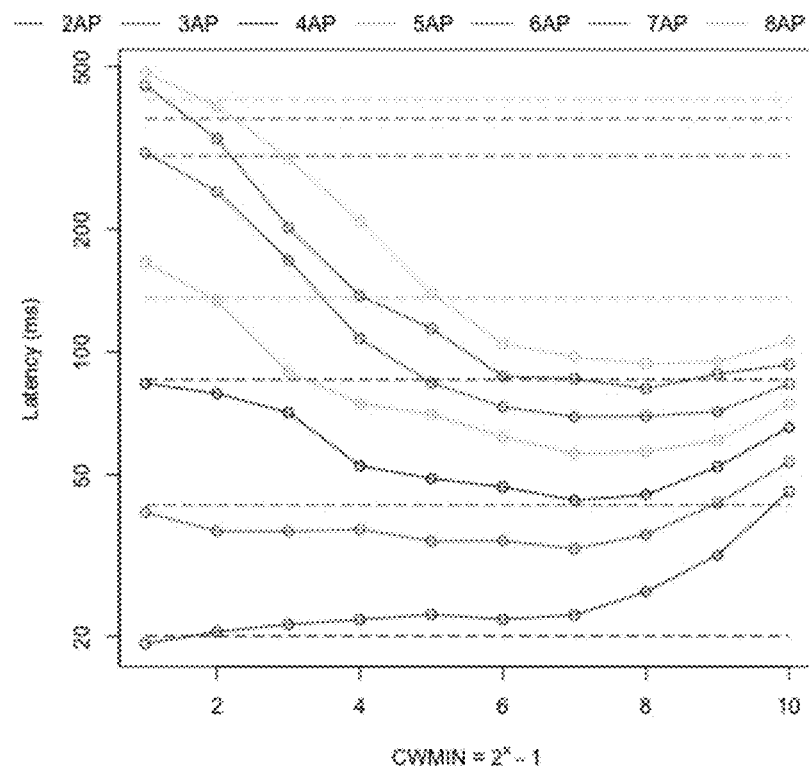

Note, in the graphs in FIG. 13, the dotted lines refer to [cwmin, cwmax]=[1, 1023]. Comparing the dotted lines in FIG. 2 and FIG. 3 with the dotted lines in FIG. 13, one sees that the extended range of the default backoff mechanism has a negative effect both on the throughput and on the latency. This shows that the default mechanism is not good at adjusting to the optimal window. Recall, that the default range for BEB best effort traffic, which is used here, is [cwmin, cwmax]=[15, 63].

Collision Reduction with Optimal Contention Window

What is the reduction in collisions if an optimal CW is used? To answer this question, all the packets sent from 8 concurrent unlimited TCP streams both in the case of the default back-off mechanism and with the optimal CW for 8 transmitters in a saturated state were collected. Then, the 802.11 header Frame Control Field retry bit (12th frame control bit) was studied and the proportion of packets that were marked as retries was counted. All packet captures cover 30 seconds (three 10 second bursts). With an optimal CW the system had 12% retries or collisions, whereas the system with the default mechanism had 61%, which is a 78% reduction in collisions (retries). The total packet volume transmitted was 407 MBytes with an optimal CW and 376 MBytes with default.

RTS/CTS Impact

Does enabling RTS/CTS impact the collision probability? In all the experiments up to this point RTS/CTS was enabled. Now, with an optimal CW and RTS/CTS turned off the collision probability measured as per above was 7%, and with the default back-off and no RTS/CTS the probability of a collision was 33%. Hence, in an RTS/CTS scenario the reduction in collisions was 78%. So although there are fewer collisions overall the proportional reduction is the same. These results are summarized in Table 1. The total packet volume transmitted was 406 MBytes with an optimal CW and 383 MBytes with default. The collision probability drops by half, and the optimal CW also drops slightly, when RTS/CTS is disabled. More drastically, the throughput (goodput) improvement of setting an optimal CW goes down to about 13% from about 155% (see results for 8 APs). The change is solely due to the default backoff mechanism improving when RTS/CTS is turned off. The throughput numbers when using an optimal CW are roughly the same, when RTS/CTS is on and when it is off. However, RTS/CTS needs to be turned on in dense environments to avoid hidden node issues, and with a sufficiently large number of competing transmitters it will likely start decaying again even without RTS/CTS. Note, that this result may seem counter-intuitive as RTS/CTS is often enabled to decrease collisions. But this experiment shows that there is a point of overload where the RTS/CTS frames themselves can cause too many collisions.

TABLE 1

| Collision Probability (%) | | |
|---|---|---|
| | Default | Optimal |
| With RTS/CTS | 61 | 12 |
| No RTS/CTS | 33 | 7 |

Fairness

Is it fairer to set both cwmin and cwmax to be the same optimal value across all APs than to use an exponential backoff? To test this assertion, the same benchmark with 8 concurrent transmitters (APs), n=8, using unlimited TCP traffic was run and the Jain Fairness Index was measured:

$$\frac{\left(\sum_{i=1}^{n} x_i\right)^2}{n \sum_{i=i}^{n} x_i^2} \tag{5}$$

where x is the throughput and n the number of transmitters. The value is between 1/n, minimum fairness, and 1, maximum fairness. In a sample of 5 runs, and when setting an optimal cw we get a Jain index of 0.982±0.006 and for the default backoff mechanism we get 0.980±0.17 with a 95% confidence band assuming a normal distribution. The mean value difference is not significant, as both values are very high with 8 streams, but the variance in values is significantly larger with the default backoff algorithm. The conclusion is hence that setting the same optimal contention window across all APs is fair, as expected. We also note that the default [cwmin, cwmax] range for best effort traffic is [15, 63] so the unfairness as a result of doubling the wait time is limited. If we instead set the [cwmin, cwmax] to [1, 1023] we get a Jain index of 0.816±0.059 which is significantly lower and showcases the danger of exponential backoff.

STATEMENTS REGARDING INCORPORATION BY REFERENCE AND VARIATIONS

Systems, methods and algorithms for predicting optimal contention windows based on load are disclosed in Sandholm, Thomas et al. "Learning to Wait: Wi-Fi Contention Control using Load-based Predictions." ArXiv abs/1912.06747 (2019): n. page., which is incorporated by reference herein in its entirety.

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used Interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, consisting of excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for identifying an optimal contention window in a listen-before-talk network comprising:
    monitoring network traffic through a plurality of transmitters in a listen-before-talk (LBT) network;
    creating a calibration queue as part of a record;
    predicting an optimal contention window time ($CW_{opt}$) for an observed system load using a machine learning model trained on contention windows (CWs) from the record that provide the highest quality of service (QoS) at selected system loads;
    setting both $CW_{min}$ and $CW_{max}$ to the $CW_{opt}$ on all of the transmitters in the LBT network; and
    adding the observed system load, the $CW_{opt}$, and a resulting QoS to a prediction queue of the record.

2. The method of claim 1, wherein creating the calibration queue comprises:
    recording system load and CW in a first time period and QoS in a subsequent time period;
    selecting a new CW round robin in exponential steps;
    setting the new CW on all of the transmitters in the LBT network; and
    repeating the steps of recording, selecting, and setting until the calibration queue is full.

3. The method of claim 2 further comprising randomly exploring a new CW and replacing a portion of the data in the calibration queue.

4. The method of claim 1, wherein the system load is based on system throughput and number of active transmitters.

5. The method of claim 1, wherein the quality of service comprises one or more parameters selected from the group consisting of throughput, latency, jitter, dropped packets and collisions.

6. The method of claim 1 further comprising repeating the steps of predicting, setting and adding to dynamically adjust the $CW_{opt}$.

7. The method of claim 1 further comprising quantizing system load based at least in part on sample distribution percentiles.

8. The method of claim 1, wherein the machine learning model is a linear regression model, a Nave Bayes model, or a deep-neural network (DNN) model.

9. The method of claim 1, wherein each of the queues is populated on a first-in first-out basis.

10. The method of claim 1, wherein the LBT network is a Wi-Fi network, a cognitive radio network, or a license assisted access (LAA) network.

11. A non-transitory computer-readable medium having a plurality of non-transitory instructions executable with a processor for identifying an optimal contention window in a listen-before-talk network, the plurality of non-transitory instructions being executable for:
    monitoring network traffic through a plurality of transmitters in a listen-before-talk (LBT) network;
    creating a calibration queue as part of a record;
    predicting an optimal contention window time ($CW_{opt}$) for an observed system load using a machine learning model trained on contention windows (CWs) from the record that provide the highest quality of service (QoS) at selected system loads;

setting both $CW_{min}$ and $CW_{max}$ to the $CW_{opt}$ on all of the transmitters in the LBT network; and adding the observed system load, the $CW_{opt}$, and a resulting QoS to a prediction queue of the record.

12. The non-transitory computer-readable medium of claim 11, wherein creating the calibration queue comprises:

recording system load and CW in a first time period and QoS in a subsequent time period;

selecting a new CW round robin in exponential steps;

setting the new CW on all of the transmitters in the LBT network; and repeating the steps of recording, selecting, and setting until the calibration queue is full.

13. The non-transitory computer-readable medium of claim 11, wherein the plurality of non-transitory instructions are further executable for repeating the steps of predicting, setting and adding to dynamically adjust the $CW_{opt}$.

14. The non-transitory computer-readable medium of claim 11, wherein the plurality of non-transitory instructions are further executable for quantizing system load based at least in part on sample distribution percentiles.

15. A system for identifying an optimal contention window in a listen-before-talk network, comprising:

a cable modem termination system (CMTS) monitoring network traffic through a plurality of transmitters in a listen-before-talk (LBT) network; and a processor configured to create a calibration queue as part of a record; predict an optimal contention window time ($CW_{opt}$) for an observed system load using a machine learning model trained on contention windows (CWs) from the record that provide the highest quality of service (QoS) at selected system loads; set both $CW_{min}$ and $CW_{max}$ to the $CW_{opt}$ on all of the transmitters in the LBT network; and add the observed system load, the $CW_{opt}$, and a resulting QoS to a prediction queue of the record.

16. The system of claim 15, wherein the processor is further configured to record system load and CW in a first time period and QoS in a subsequent time period; select a new CW round robin in exponential steps; set the new CW on all of the transmitters in the LBT network; and repeat the steps of recording, selecting, and setting until the calibration queue is full.

17. The system of claim 15, wherein the processor is further configured to repeat the steps of predicting, setting and adding to dynamically adjust the $CW_{opt}$.

18. The system of claim 15, wherein the processor is further configured to quantize system load based at least in part on sample distribution percentiles.

19. The system of claim 15, wherein the machine learning model is a linear regression model, a Naive Bayes model, or a deep-neural network (DNN) model.

20. The system of claim 15, wherein the LBT network is a Wi-Fi network, a cognitive radio network, or a license assisted access (LAA) network.

* * * * *